(12) United States Patent     (10) Patent No.: US 12,639,917 B2

Munoz Delgado     (45) Date of Patent: May 26, 2026

(54) RATING OF GENERATORS FOR GENERATING REALISTIC IMAGES

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 648 days.

(21) Appl. No.: 18/060,011

(22) Filed: Nov. 30, 2022

(65) Prior Publication Data

US 2023/0186598 A1     Jun. 15, 2023

(30) Foreign Application Priority Data

Dec. 15, 2021    (DE) ..................... 10 2021 214 464.0

(51) Int. Cl.
| | |
|---|---|
| *G06T 7/10* | (2017.01) |
| *G06V 10/74* | (2022.01) |
| *G06V 10/764* | (2022.01) |

(52) U.S. Cl.
CPC .............. *G06V 10/761* (2022.01); *G06T 7/10* (2017.01); *G06V 10/764* (2022.01)

(58) Field of Classification Search
CPC .. G06V 10/761; G06V 10/764; G06V 10/776; G06V 20/58; G06V 10/993; G06V 10/82; G06V 20/56; G06T 7/10; G06N 3/04; G06N 3/08
See application file for complete search history.

(56) References Cited

U.S. PATENT DOCUMENTS

| | | | | |
|---|---|---|---|---|
| 2023/0134062 A1* | 5/2023 | Khoreva | ............... | G06T 11/001 |
| | | | | 382/104 |
| 2023/0222377 A1* | 7/2023 | Gardner | ............. | G06Q 30/0269 |
| | | | | 706/12 |

FOREIGN PATENT DOCUMENTS

| | | |
|---|---|---|
| DE | 102018204494 B3 | 8/2019 |

OTHER PUBLICATIONS

Yiheng Zhang, Zhaofan Qiu, Ting Yao, Dong Liu, Tao Mei; Proceedings of the IEEE Conference on Computer Vision and Pattern Recognition (CVPR), 2018, pp. 6810-6818 (Year: 2018).*

(Continued)

*Primary Examiner* — Stephen R Koziol
*Assistant Examiner* — Ashley Hytrek
(74) *Attorney, Agent, or Firm* — NORTON ROSE FULBRIGHT US LLP

(57) ABSTRACT

A method for quantitatively rating a trained generator that generates, from an input vector from a predetermined input distribution in connection with a target segmentation map, an image whose semantic content is in line with this target segmentation map. The method includes: drawing at least one input vector from the predetermined input distribution; drawing at least one list of classes from a predetermined class distribution; determining a target segmentation map, which assigns classes from this list of classes to the pixels of the image to be generated; generating, by means of the generator, an image from the input vector and the target segmentation map; determining a semantic segmentation map of the image by means of an image classifier; determining, using a predetermined metric, the degree of matching between this semantic segmentation map and the target segmentation map; determining, using this degree of matching, the quantitative rating of the generator.

13 Claims, 4 Drawing Sheets

Fig. 1B

(56) References Cited

OTHER PUBLICATIONS

Taesung Park, Ming-Yu Liu, Ting-Chun Wang, Jun-Yan Zhu; Proceedings of the IEEE/CVF Conference on Computer Vision and Pattern Recognition (CVPR), 2019, pp. 2337-2346 (Year: 2019).*

M. Lukac, A. Zhurtanov and A. Ospanova, "High-level verification of multi-object segmentation," 2016 International Conference on Information and Digital Technologies (IDT), Rzeszow, Poland, 2016, pp. 173-179, doi: 10.1109/DT.2016.7557169. (Year: 2016).*

Souly, Nasim, Concetto Spampinato, and Mubarak Shah. "Semi supervised semantic segmentation using generative adversarial network." Proceedings of the IEEE international conference on computer vision. 2017. (Year: 2017).*

Le Moing G, Vu TH, Jain H, Perez p. Cord M. Semantic Palette: Guiding Scene Generation with Class Proportions. In2021 IEEE/Cvf Conference on Computer Vision and Pattern Recognition (CVPR) Jun. 1, 2021 (pp. 9338-9346). IEEE Computer Society. (Year: 2021).*

Chen H, Jin Y, Jin G, Zhu C, Chen E. Semisupervised semantic segmentation by improving prediction confidence. IEEE Transactions on Neural Networks and Learning Systems. Mar. 29, 2021;33(9):4991-5003. (Year: 2021).*

Cheng, Yen-Chi, Hsin-Ying Lee, Min Sun, and Ming-Hsuan Yang. "Controllable image synthesis via segVAE." In European conference on computer vision, pp. 159-174. Cham: Springer International Publishing, 2020. (Year: 2020).*

Isola, Phillip, Jun-Yan Zhu, Tinghui Zhou, and Alexei A. Efros. "Image-to-image translation with conditional adversarial networks." In Proceedings of the IEEE conference on computer vision and pattern recognition, pp. 1125-1134. 2017. (Year: 2017).*

Chen et al., "Semisupervised Semantic Segmentation by Improving Prediction Confidence," IEEE Transactions on Neural Networks and Learning Systems, 2022, pp. 1-13.

Souly et al., "Semi Supervised Semantic Segmentation Using Generative Adversarial Network," 2017 IEEE International Conference on Computer Vision, 2021, pp. 5689-5697.

* cited by examiner

RATING OF GENERATORS FOR GENERATING REALISTIC IMAGES

CROSS REFERENCE

The present application claims the benefit under 35 U.S.C. § 119 of German Patent Application No. DE 10 2021 214 464.0 filed on Dec. 15, 2021, which is expressly incorporated herein by reference in its entirety.

FIELD

The present invention relates to the rating of generators for realistic images that may be used, for example, for training image classifiers.

BACKGROUND INFORMATION

When a human driver operates vehicles in traffic, observations of the vehicle environment by the driver are the most important source of information for the driver's decisions. Accordingly, for at least partially automated driving, it is necessary to evaluate observations of the vehicle environment automatically by means of cameras and other sensors. For this purpose, image classifiers are in particular used, which map an input image to classification scores with respect to one or more classes of a predetermined classification or generate a segmentation map of the input image that assigns each pixel of the input image to a class.

The supervised training of such image classifiers requires large amounts of training input images, each labeled with target outputs, to which the image classifier should ideally map the respective training input image. German Patent No. DE 10 2018 204 494 B3 describes a method by which radar signals can be generated synthetically in order to need less labeled training data overall when training a classifier. The method uses a generator that, together with a discriminator, forms a generative adversarial network (GAN) and is trained together with said discriminator.

SUMMARY

A method for quantitatively rating a trained generator is provided as part of the method. This trained generator generates, from an input vector from a predetermined input distribution in connection with a list of classes drawn from a predetermined class distribution, a target segmentation map that assigns classes from the drawn list of classes to the pixels of an image to be generated. In particular, an image may, for example, be generated from this target segmentation map in connection with the input vector by a further generator. Thus, an overall generator is created, which generates an image from an input vector and a list of classes. Thus, if an input vector and a list of classes are supplied to this overall generator, a target segmentation map is first determined before the desired image is then generated from this target segmentation map.

The purpose of such an overall generator is to generate not any realistic-looking images but rather images with a particular content of objects that is predetermined by the list of classes. Generators often serve to enlarge a data set of training input images for an image classifier with synthetically generated images so that the image classifier can subsequently be trained thereon. Here, it is a particularly great asset for the training of the image classifier if the synthetically generated images cover especially situations and constellations that may occur in the present application but are so far underrepresented in the data set of training input images. The list of classes can cause the overall generator to generate specifically such training input images.

For example, on test drives with a camera mounted on a vehicle, traffic situations with road construction sites on which work is currently being carried out may have been recorded, among other things. Such images can be used to train, for example, a system for at least partially automated driving to behave properly even in the presence of construction workers and machines on the roadway. However, the vast majority of these images will relate to daytime situations. Even if many test drives were also conducted at night, there will be only a few images taken at night and showing the construction sites in full operation. At night, work is only carried out if it is absolutely necessary, since night work incurs additional costs and additional requirements for protecting residents must be observed. For the training of a system for at least partially automated operation of the vehicle, it may thus be useful to synthetically generate realistic images having full operation of construction sites at night time.

The method therefore aims to rate a generator as to the extent to which a target segmentation map generated by it can be used to generate realistic images. The extent to which images generated from the target segmentation map are realistic is measured by how well a semantic segmentation of these generated images matches the target segmentation map. Such measured generator performance may in particular depend, for example, on the list of classes to be represented in the images in each case.

As part of the method, at least one input vector is therefore drawn from the predetermined input distribution. Depending on the nature of this input distribution, the input vector can, for example, be filled with random values from the input distribution for this purpose. For example, if the input distribution belongs to a latent space accessible only by a mapping by means of a trained encoder, random values may be supplied to the encoder and a vector that is provided by the encoder and belongs to the input distribution may be used as the input vector.

Furthermore, at least one list of classes is drawn from a predetermined class distribution. These classes represent the "wish list" with regard to the content of objects in the target segmentation map to be generated, and thus also in an image to be generated from this target segmentation map.

By means of the trained generator, a target segmentation map, which assigns classes from the drawn list of classes to the pixels of an image to be generated, is determined from the input vector. At least this target segmentation map is used to generate an image whose semantic content is in line with the target segmentation map.

For the image generated from the target segmentation map, a semantic segmentation map is determined by means of an image classifier. The degree of matching between this semantic segmentation map and the target segmentation map is determined using a predetermined metric. This degree of matching is used to determine the quantitative rating of the generator that generated the target segmentation map.

It has been discovered that by using the image classifier as a "calibrated measuring device," it can in this way be checked to what extent segmentation maps generated by the generator are realistic. For example, if the image classifier is a machine learning model, it has mostly been trained in a supervised manner to map real training images to associated segmentation maps ("ground truth"). Thus, if a non-realistic image is presented to the image classifier, it is outside the distribution on which the image classifier was trained. However, the image classifier is more or less tied to the distribution of its training data and will therefore provide a semantic segmentation map that matches any realistic image from the distribution defined by the training data. This may include, for example, ignoring particular image regions or introducing new pixel regions in which a learned "bias" manifests. If the non-realistic image was generated from a target segmentation map provided by the generator, the semantic segmentation map provided by the image classifier will therefore very likely deviate significantly from the target segmentation map.

For example, it can be detected in this way if the target segmentation map contains all the objects desired according to the list of classes, but these objects are not arranged relative to one another in the target segmentation map in a manner that is realistic in the context of the present application. For example, if the list of classes includes the "Highway", "Car", and "Cruise Ship" classes, it does not seem realistic for the cruise ship to be in the middle of the highway even with an exceptionally good technical image quality. It is rather plausible, for example, that the highway leads to a coast and the cruise ship travels in the sea beyond the coast.

According to an example embodiment of the present invention, a generator well-rated according to the method provided herein may, for example, be used to provide target segmentation maps for generating realistic images by means of a further generator. The images provided by this further generator can then not only be rated as to whether they look realistic at all. Rather, the underlying target segmentation maps can also be rated simultaneously with regard to the variance of objects and object combinations.

There are many two-step methods for generating realistic images, first generating target segmentation maps and then images therefrom. In such methods, the previously used source for target segmentation maps can then, for example, be replaced by a well-rated generator.

Thus, in a particularly advantageous embodiment of the present invention, the image whose semantic segmentation will be compared to the target segmentation map is generated by a further trained generator from the target segmentation map in connection with the input vector. This generator assumes the input vector and the target segmentation map as given and generates therefrom an image of objects belonging to classes of a desired list of classes. It is thus responsible for translating the target segmentation map into a realistic-looking image having a predetermined content of objects having a variability controlled by the input vector.

The combination of a well-rated generator for target segmentation maps and a further generator for generating images can be used to generate realistic images of even unusual sceneries. For example, in the context of at least partially automated driving, these sceneries may be situations that occur only rarely but then absolutely require a proper response of the vehicle. These are, for example, "corner cases," i.e., particularly dangerous situations, which, due to the high risk, are not permitted to be caused intentionally for the purpose of acquiring training input images for image classifiers. It has been found that the usual training of a generator for images is only aimed at generating realistic images from a predetermined distribution. Training is continued until a discriminator trained together with the generator can no longer distinguish the images generated by the generator from real images from the predetermined distribution. However, there is a tendency for the images generated by the generator to be concentrated on particular modes within the predetermined distribution, while only a few of the generated images are found between these modes. The situation is somewhat analogous to ship travel on an ocean, which concentrates along particular routes, while not a single ship may be encountered for a long time in the area between these routes. By predetermining the class distribution for the generator generating the target segmentation map, it can be controlled which regions of the large and multi-dimensional distribution of realistic images are ultimately covered.

According to an example embodiment of the present invention, the present method may be used to determine the ability of the generator to determine a target segmentation map that contains objects from classes of a predetermined list of classes and is simultaneously realistic in its entirety. In particular, several generators may be compared to one another based on the determined quantitative rating. A quantitative rating may thus respectively be determined for several trained generators. A generator having the best quantitative rating may then be combined with a further generator that further processes target segmentation maps into images. Overall, an overall generator is thus formed that generates, from an input vector and a list of classes, an image that is realistic in the context of the respective application and contains objects of the desired classes.

In this case, one and the same image classifier determining the semantic segmentation map of the generated image may be used to rate several generators for generating target segmentation maps. However, a dedicated image classifier is particularly advantageously used for each generator, said image classifier having been specifically trained to map images generated from target segmentation maps of said generator back to said target segmentation maps. The comparison of the two generators is then not affected by a single image classifier randomly "harmonizing" better with the one generator or the other generator. The rating may additionally be objectified by enriching the images resulting from target segmentation maps generated by the respectively associated generator with real captured images from a predetermined training data set D during the training of each image classifier.

Repeatedly training image classifiers for different class distributions, i.e., for different sampling strategies for the lists of classes to be drawn, can require a lot of computing time. However, if, for example, the class distribution, or the sampling strategy, is varied based on the current epoch of the training of the image classifier according to a scheme established in advance, many different class distributions, or sampling strategies, can be used, but only a single training of the image classifier is needed.

Several trained generators may, for example, be obtained by initializing the training of the generator on one and the same architecture having different start values. However, generators having different architectures may, for example, also be compared. For example, the architecture of the generator may be parameterized with one or more hyperparameters that decide about the type or size of layers of neural networks, for example. The hyperparameters can then be varied and the generator can respectively be retrained. A new quantitative rating may subsequently be respectively determined for the retrained generator. In this way, the values of the hyperparameters that result in the best quantitative rating with regard to the generation of images having predetermined content can be found.

In order to direct the generation of target segmentation maps, or the later generation of images, specifically in the direction of rare segmentation maps, or rare images (such as said "corner cases"), the predetermined class distribution in a particularly advantageous embodiment is determined from a probability distribution, which indicates the conditional probability $P(D_c|C_c)$ with which pairs of objects of which classes $C_c$ and $D_c$ occur together in a predetermined data set D of images. Assuming that at least one object of class $C_c$ occurs, the matrix P thus indicates the probability with which at least one object of class $D_c$ also occurs. By means of pairs of objects of particular classes that occur together, images having a semantic structure differ from images in which all object classes $D_c$ are equally distributed. The consideration of such pairs makes the images generated by the overall generator more realistic since this prevents, for example, a situation in which one of two objects that must always occur together is missing. For example, on a roadway of flowing traffic, a bicycle or a motorcycle always occurs in combination with a rider. An image in which the bicycle or motorcycle or else the rider is missing would not be realistic at first glance. Determining the class distribution in this way establishes a possible "sampling strategy" for drawing a list of classes. However, any other "sampling strategies" may also be used, which may, for example, be focused on other optimization goals.

In particular, in a particularly advantageous embodiment, the predetermined class distribution between the probability distribution $P(D_c|C_c)$ and a uniform distribution $U(D_c)$ of all object classes $D_c$ occurring in the images in the data set D can be interpolated. The closer the predetermined class distribution is on an imaginary line between $P(D_c|C_c)$ and $U(D_c)$ to $U(D_c)$, the more the generated images are shifted toward images that still look realistic in the context of the application but constitute an innovation and thus an enrichment compared to the already existing data set D.

A predetermined number k of different class distributions $P_1, \ldots, P_k$ can in particular be interpolated, for example. If the method is respectively continued, a new degree of matching is respectively determined based on these k different class distributions. These k degrees of matching may then be aggregated to the desired quantitative rating of the generator. In doing so, a particularly good rating of the generator for class distributions that are closer to $U(D_c)$ may indeed overcompensate for a worse rating of this generator for class distributions that are closer to $P(D_c|C_c)$. The ability of the generator to generate images that are not contained in the distribution defined by the already existing data set D can thus be specifically "rewarded." The stability of the generator on the way to $U(D_c)$ can in particular be assessed.

In this respect, the tendency is to be expected that the degree of matching for interpolations close to $P(D_c|C_c)$ is higher than for interpolations close to $U(D_c)$. In order to stay with the aforementioned image of the ocean, $P(D_c|C_c)$ represents the busy ocean shipping lanes on which the generator has been extensively trained, and $U(D_c)$ represents locations in the middle of nowhere to which a ship very rarely strays. However, the flatter the degree of matching drops with increasing approximation of the class distribution to the uniform distribution $U(D_c)$, the better the generator is able to generate innovations compared to the already existing data set D. Accordingly, its quantitative rating is then advantageously also better.

For example, the list of classes may be generated by randomly drawing a first class $C_c$. Further classes $D_c$ may then be drawn based on the conditional probability with which they occur together with the class $C_c$, according to the probability distribution. This way of generating the list of classes thus does not involve absolute probabilities of object classes $D_c$. Instead, the conditional probabilities substantially more meaningful with respect to the semantic content of the image to be generated are sufficient.

In particular, several lists of classes may be drawn from the class distribution, for example. Based on these different lists of classes, the degree of matching may respectively be determined. These degrees of matching can then be aggregated to the desired quantitative rating of the generator. Via the various lists of classes, a "capability spectrum" of the generator can thus be defined with regard to particular types of situations.

The quantitative rating of the generator can then be advantageously additionally supplemented by a term that measures to what extent the target segmentation map generated by the generator actually also contains all classes from the drawn list. The generator is then not able simply to "withdraw" from the task of providing a target segmentation map for a particularly rare and therefore difficult constellation of classes by simply ignoring the classes that it manages worst. This avoidance tactic is common in almost all disciplines when working on exams, since hardly any student is generally able to solve all tasks. Early elimination of non-achievable tasks and allocation of available time to the achievable tasks is thus the key to success in exams. However, the generator is not intended to just achieve a passing grade in a study course but to become a specialist, especially for the difficult cases.

The degree of matching is advantageously determined separately for all classes occurring in the semantic segmentation map and is subsequently aggregated over these classes. In this way, the degree of matching becomes independent of the semantic importance of the individual classes. Only regions assigned to the same classes are thus compared to one another.

In particular, for example, for regions belonging to a particular class according to the semantic segmentation map on the one hand and according to the target segmentation map on the other hand, an intersection over union, IoU, can be determined as a degree of matching. The IoUs for different classes may, for example, be aggregated by averaging in order to create a "mean IoU."

As discussed above, a quantitatively best-rated generator can be selected from several trained generators and can be combined with the further generator that generates images from target segmentation maps, to form an overall generator. This overall generator can be used in a further advantageous embodiment to generate training input images for an image classifier.

According to an example embodiment of the present invention, a plurality of input vectors and lists of classes are provided for this purpose. From these input vectors and lists of classes, training input images are generated by means of the overall generator. These training input images are used to train an image classifier. The training input images generated here can in particular be added to previously existing training input images and, as explained above, can enrich them by so far underrepresented situations.

The completely trained image classifier is supplied with input images recorded by means of at least one sensor carried by a vehicle. A control signal is formed from the output of the image classifier, which may comprise, for example, classification scores with respect to one or more classes or also a semantic segmentation of the input image. The vehicle is controlled with this control signal.

In the context of controlling vehicles, this embodiment of the method has the effect that the vehicle carries out an appropriate response in a broader class of comparatively rare situations with a higher probability because it has also been trained on these situations with a sufficient number of examples.

The method may in particular be computer-implemented as a whole or in part. The present invention therefore also relates to a computer program including machine-readable instructions which, when executed on one or more computers, cause the computer(s) to perform the described method. In this sense, control devices for vehicles and embedded systems for technical devices that are likewise capable of executing machine-readable instructions are also to be regarded as computers.

Likewise, the present invention also relates to a machine-readable data storage medium and/or to a download product including the computer program. A download product is a digital product that can be transmitted via a data network, i.e., can be downloaded by a user of the data network, and may, for example, be offered for sale in an online shop for immediate download.

Furthermore, a computer may be equipped with the computer program, with the machine-readable storage medium or with the download product.

Further measures improving the present invention are described in more detail below on the basis of the figures, together with the description of the preferred exemplary embodiments of the present invention.

DETAILED DESCRIPTION OF EXAMPLE EMBODIMENTS

Figures 1A, 1B:
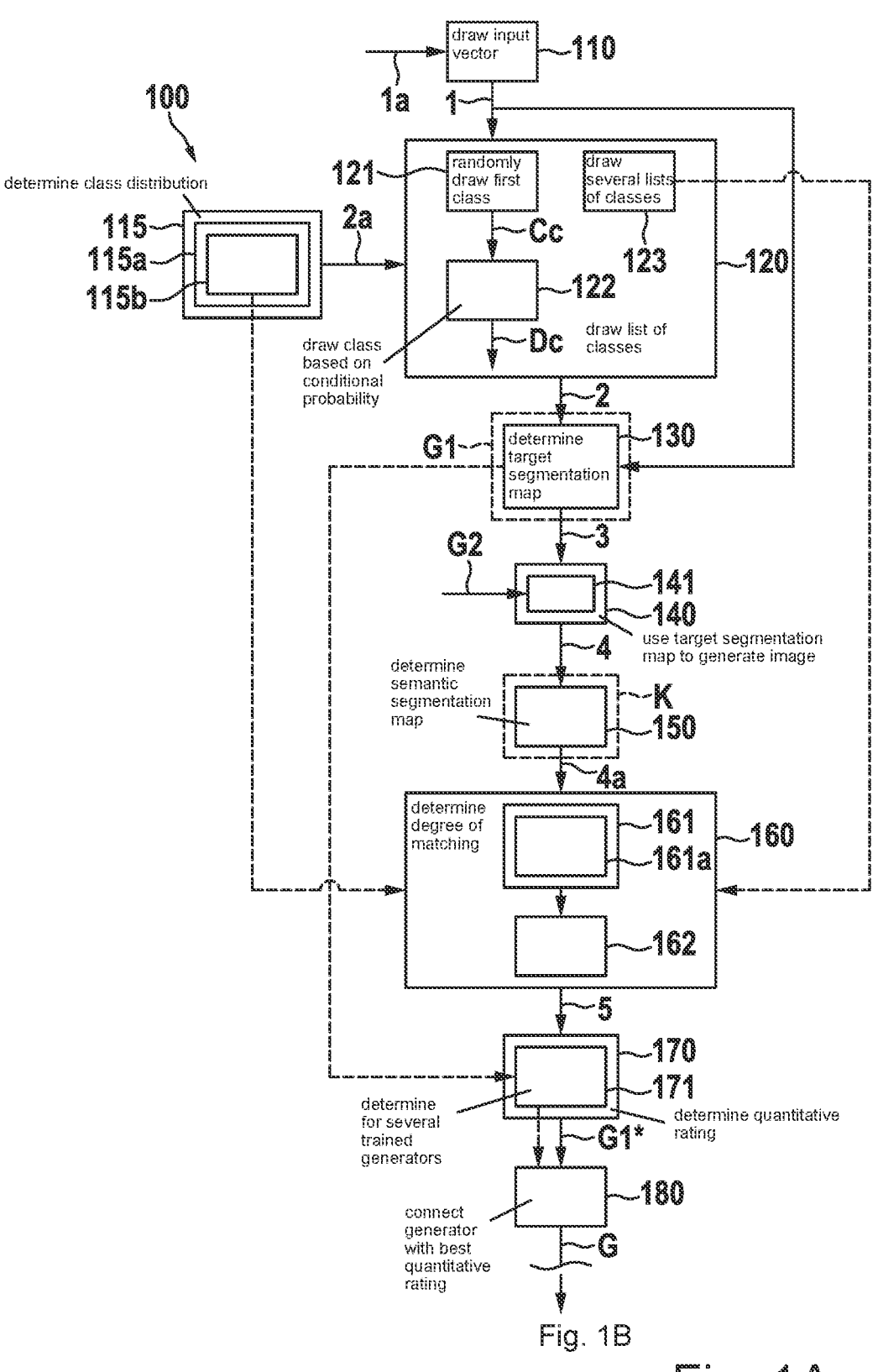
FIG. 1 shows an exemplary embodiment of method 100 for quantitatively rating a trained generator G1, according to the present invention.
Figures 1A, 1B:
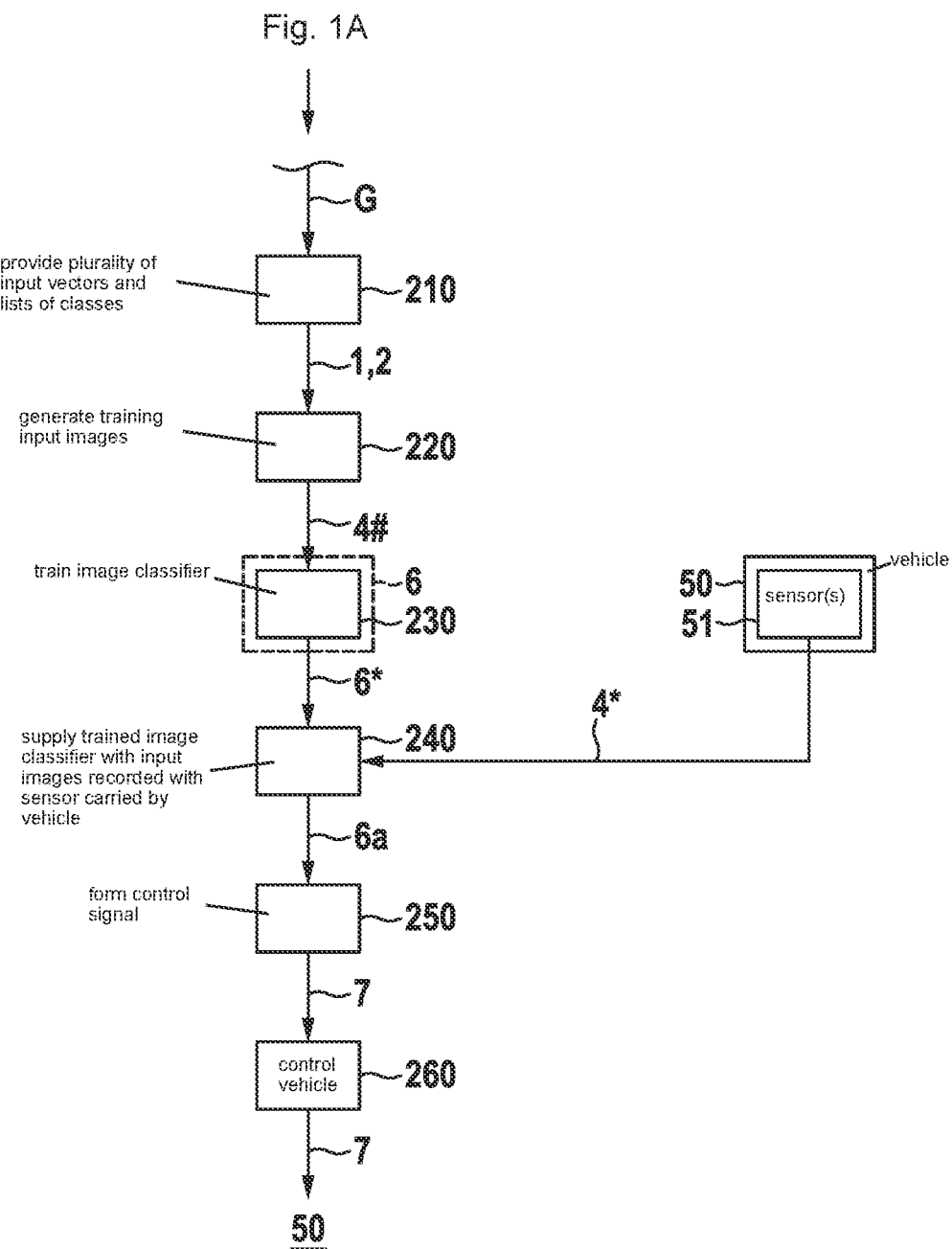

FIG. 1 is a schematic flow diagram of an exemplary embodiment of the method 100 for quantitatively rating a trained generator G1.

In step 110, at least one input vector 1 is drawn from a predetermined input distribution 1$a$. The input distribution 1$a$ may, for example, be a multi-dimensional normal distribution. In step 115, a class distribution 2$a$ is determined from a probability distribution that indicates the conditional probability $P(D_c|C_c)$ with which pairs of objects of which classes $C_c$ and $D_c$ occur together in a predetermined data set D of images.

In this case, according to block 115$a$, the predetermined class distribution 2$a$ between the probability distribution $P(D_c|C_c)$ and a uniform distribution $U(D_c)$ of all object classes $D_c$ occurring in the images in the data set D can be interpolated.

According to block 115$b$, a predetermined number k of different class distributions 2$a$ can be interpolated.

In step 120, at least one list 2 of classes is drawn from the class distribution 2$a$.

According to block 121, a first class $C_c$ may be randomly drawn. According to block 122, based thereon, further classes $D_c$ may be drawn based on the conditional probability with which they occur together with the class $C_c$, according to the probability distribution.

According to block 123, several lists 2 of classes may be drawn.

In step 130, by means of the trained generator G1, a target segmentation map 3, which assigns classes from the list 2 of classes to the pixels of an image 4 to be generated, is determined from the input vector 1.

In step 140, at least the target segmentation map 3 is used to generate an image 4.

According to block 141, the image 4 may be generated by a further trained generator G2 from the target segmentation map 3 in connection with the input vector 1.

In step 150, a semantic segmentation map 4$a$ of the image 4 is determined by means of an image classifier K.

In step 160, a predetermined metric is used to determine the degree 5 of matching between this semantic segmentation map 4$a$ and the target segmentation map 3.

This may in particular be done separately according to block 161 for the classes present in the segmentation map 4$a$, and subsequently aggregated over these classes according to block 162. According to block 161$a$, an intersection over union, IoU, may in particular be determined here.

In step 170, the degree 5 of matching is used to determine the quantitative rating G1* of the generator G1.

According to block 171, a quantitative rating G1* may in particular respectively be determined for several trained generators G1, for example. A generator G1 with the best quantitative rating G1* may then be connected upstream of the further trained generator G2 in step 180. Overall, an overall generator is formed, which generates an image 4 from an input vector 1 and a list 2 of classes.

To the extent that a predetermined number k of different class distributions 2$a$ is interpolated according to block 115$b$ and/or several lists 2 of classes are drawn according to block 123, separate degrees 5 of matching may respectively be determined and aggregated.

In step 210, a plurality of input vectors 1 and lists 2 of classes are provided.

In step 220, from these input vectors 1 and lists 2 of classes, training input images 4 # are generated by means of the overall generator G.

In step 230, these training input images 4 # are used to train an image classifier 6. The fully trained state of the image classifier 6 is denoted by reference numeral 6*.

In step 240, the trained image classifier 6* is supplied with input images 4* recorded with at least one sensor 51 carried by a vehicle 50.

In step 250, a control signal 7 is formed from output 6$a$ of the image classifier 6*.

In step 260, the vehicle 50 is controlled with the control signal 7.

Figure 2:
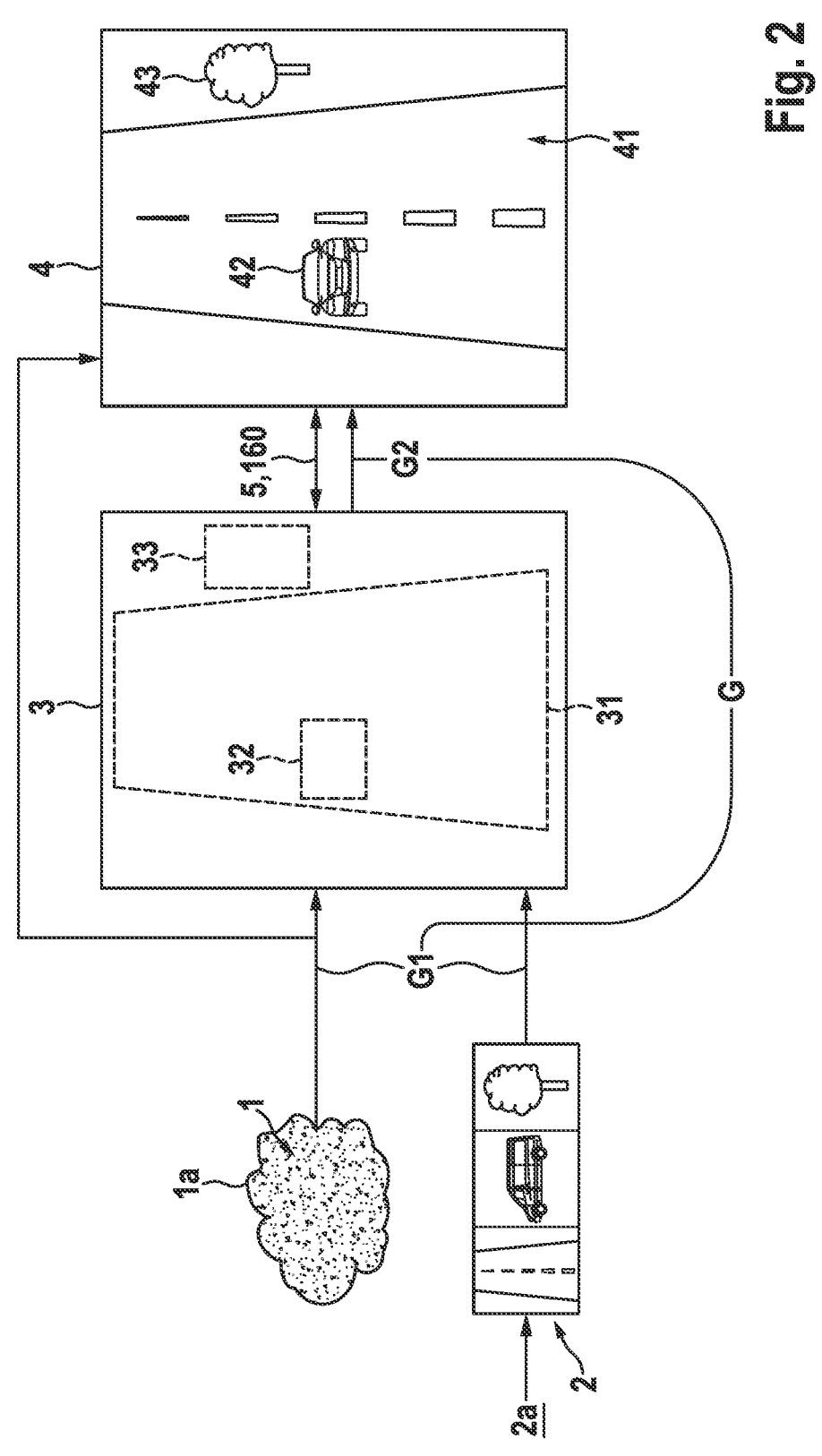
FIG. 2 shows exemplary generation of an image 4 by means of an overall generator G consisting of the trained generator G1 and a downstream generator G2, according to the present invention.

FIG. 2 shows, by way of example, how an image 4 can be generated from an input vector 1 and a list 2 of classes by means of an overall generator G consisting of two generators G1 and G2.

In the example shown in FIG. 2, the input distribution 1$a$ is a multi-dimensional normal distribution so that the input vector 1 contains random values. The class list 2 drawn from the class distribution 2$a$ contains the "Road", "Vehicle", and "Tree" classes here.

From the class list 2 and the input vector 1, the generator G1, which is rated using the present method 100, constructs a target segmentation map 3 with a realistic arrangement of the objects requested according to the class list 2. Accordingly, the target segmentation map 3 contains a region 31 assigned to the "Road" class, a region 32 assigned to the "Vehicle" class, and a region 33 assigned to the "Tree" class. The generator G1 has learned that, for example, a vehicle located off the road or a tree located in the middle of the road would be unrealistic at first glance.

The generator G2 processes the input vector 1 and the target segmentation map 3 further into the image 4, which contains a specific road 41, a specific vehicle 42, and a specific tree 43. If the input vector 1 were changed, road 41, vehicle 42, and tree 43 would each be replaced by differently looking specimens. However, these specimens would still be placed at the positions specified by the target segmentation map 3. The method described herein checks in step 160 the degree 5 of matching of a semantic segmentation of the generated image 4 with the target segmentation map 3.

Figure 3:
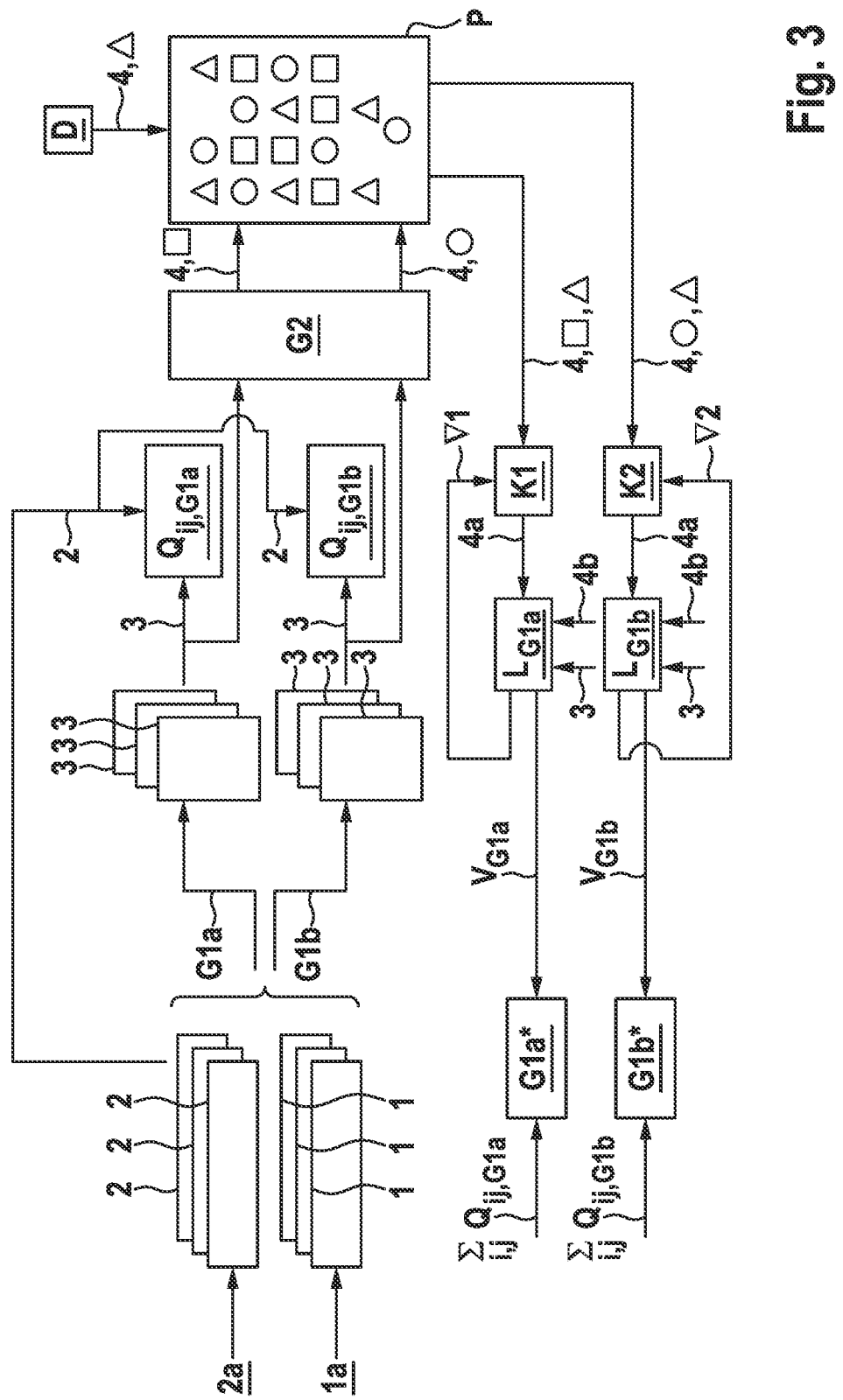
FIG. 3 shows exemplary rating of two generators G1$a$ and G1$b$, combined with the training of two image classifiers K1 and K2, according to the present invention.

FIG. 3 illustrates, by way of example, how two generators G1a and G1b can be quantitatively rated using respectively adapted image classifiers K1 and K2 and the image classifiers K1 and K2 can be trained simultaneously. As explained above, the use of a first image classifier K1 to rate the first generator G1a and of a second image classifier K2 to rate the second generator G1b makes the obtained ratings G1a* and G1b* more comparable.

Input vectors 1 are drawn from the input distribution 1a. Lists 2 of classes are drawn from the class distribution 2a. Based on the same combinations of input vectors 1 and lists 2 of classes, target segmentation maps 3 are respectively determined by means of both generators G1a and G1b. As the first component $Q_{ij,G1a}$ of the rating G1a* of the generator G1a, it is now determined to what extent the respectively generated target segmentation maps 3 actually contain all requested classes from the lists 2. Herein, i denotes the index of the current batch and j denotes the index of the current epoch.

The target segmentation maps 3 determined by both generators G1a and G1b are processed by means of a further trained generator G2 into images 4 and combined with real images 4 from a training data set D in a pool P.

The first image classifier K1 is trained on mixed batches of images 4 that result from target segmentation maps 3 (symbolized by squares) generated by the first generator G1a or originate from the training data set D (symbolized by triangles).

The second image classifier K2 is trained on mixed batches of images 4 that result from target segmentation maps 3 (symbolized by circles) generated by the second generator G1b or originate from the training data set D (symbolized by triangles).

By comparison with the respective target segmentation maps 3, or the ground truth segmentation maps 4b associated with real images 4, a segmentation loss $L_{G1a}$ or $L_{G1b}$ is determined for the two image classifiers K1 and K2, respectively. This segmentation loss $L_{G1a}$ or $L_{G1b}$ is propagated back via respective gradients ∇1 or ∇2 to the respective image classifier K1 or K2 to train it.

After the image classifiers K1 and K2 are completely trained, for images 4 resulting from target segmentation maps 3 generated by the first generator G1a, a score $V_{G1a}$ for the segmentation maps 4a of said images 4 matching the respective target segmentation maps 3 is determined, and for images 4 resulting from target segmentation maps 3 generated by the second generator G1b, a score $V_{G1b}$ for the segmentation maps 4a of said images 4 matching the respective target segmentation maps 3 is determined.

The score $V_{G1a}$ is combined with the sum over $Q_{ij,G1a}$ for all batches i and epochs j for the rating G1a* of the generator G1a.

The score $V_{G1b}$ is combined with the sum over $Q_{ij,G1b}$ for all batches i and epochs j for the rating G1b* of the generator G1b.

What is claimed is:

1. A method for quantitatively rating a trained generator that generates a target segmentation map from an input vector from a predetermined input distribution, comprising the following steps:

drawing at least one input vector from the predetermined input distribution;

drawing at least one list of classes from a predetermined class distribution, wherein the predetermined class distribution is determined from a probability distribution that indicates a conditional probability $P(D_c|C_c)$ with which pairs of objects of which classes $C_c$ and $D_c$ occur together in a predetermined data set D of images, wherein the predetermined class distribution is interpolated between the probability distribution $P(D_c|C_c)$ and a uniform distribution $U(D_c)$ of all object classes $D_c$ occurring in the images in the data set D;

determining, using the trained generator, a target segmentation map, which assigns classes from the list of classes to pixels of an image to be generated, from the input vector;

generating, using at least the target segmentation map, an image whose semantic content is in line with the target segmentation map;

determining a semantic segmentation map of the generated image using an image classifier;

determining, using a predetermined metric, a degree of matching between the semantic segmentation map and the target segmentation map; and determining, using the degree of matching, the quantitative rating of the trained generator.

2. The method according to claim 1, wherein:

a predetermined number k of different class distributions is interpolated;

the degree of matching is respectively determined based on the k different class distributions; and the k degrees of matching are aggregated to the desired quantitative rating of the generator.

3. The method according to claim 2, wherein the degree of matching drops with increasing approximation of the class distribution to the uniform distribution $U(D_c)$.

4. A method for quantitatively rating a trained generator that generates a target segmentation map from an input vector from a predetermined input distribution, comprising the following steps:

drawing at least one input vector from the predetermined input distribution;

drawing at least one list of classes from a predetermined class distribution;

determining, using the trained generator, a target segmentation map, which assigns classes from the list of classes to pixels of an image to be generated, from the input vector;

generating, using at least the target segmentation map, an image whose semantic content is in line with the target segmentation map;

determining a semantic segmentation map of the generated image using an image classifier;

determining, using a predetermined metric, a degree of matching between the semantic segmentation map and the target segmentation map; and determining, using the degree of matching, the quantitative rating of the trained generator, wherein:

a first class $C_c$ is randomly drawn for the list of classes, and based on the first class $C_c$, further classes $D_c$ are drawn based on a conditional probability with which the further classes $D_c$ occur together with the class $C_c$, according to the probability distribution.

5. The method according to claim 1, wherein:

several different lists of classes are drawn from the class distribution;

a degree of matching is respectively determined based on the different lists of classes; and the degrees of matching are aggregated to the desired quantitative rating of the trained generator.

6. A method for quantitatively rating a trained generator that generates a target segmentation map from an input vector from a predetermined input distribution, comprising the following steps:

drawing at least one input vector from the predetermined input distribution;

drawing at least one list of classes from a predetermined class distribution;

determining, using the trained generator, a target segmentation map, which assigns classes from the list of classes to pixels of an image to be generated, from the input vector;

generating, using at least the target segmentation map, an image whose semantic content is in line with the target segmentation map;

determining a semantic segmentation map of the generated image using an image classifier;

determining, using a predetermined metric, a degree of matching between the semantic segmentation map and the target segmentation map; and determining, using the degree of matching, the quantitative rating of the trained generator, wherein:

several different lists of classes are drawn from the class distribution;

a degree of matching is respectively determined based on the different lists of classes;

the degrees of matching are aggregated to the desired quantitative rating of the trained generator; and a rating of an extent to which the target segmentation map generated by the trained generator also contains all the classes from the drawn list is included in the desired quantitative rating of the trained generator.

7. The method according to claim 1, wherein the degree of matching is determined separately for all classes occurring in the semantic segmentation map and is subsequently aggregated over the classes occurring in the semantic segmentation map.

8. The method according to claim 7, wherein for regions belonging to a particular class according to (i) the semantic segmentation map and (ii) the target segmentation map, an intersection over union, IoU, is determined as a degree of matching.

9. The method according to claim 1, wherein the image is generated by a further trained generator from the target segmentation map in connection with the input vector.

10. A method for quantitatively rating a trained generator that generates a target segmentation map from an input vector from a predetermined input distribution, comprising the following steps:

drawing at least one input vector from the predetermined input distribution;

drawing at least one list of classes from a predetermined class distribution;

determining, using the trained generator, a target segmentation map, which assigns classes from the list of classes to pixels of an image to be generated, from the input vector;

generating, using at least the target segmentation map, an image whose semantic content is in line with the target segmentation map, wherein the image is generated by a further trained generator from the target segmentation map in connection with the input vector;

determining a semantic segmentation map of the generated image using an image classifier;

determining, using a predetermined metric, a degree of matching between the semantic segmentation map and the target segmentation map; and determining, using the degree of matching, the quantitative rating of the trained generator, wherein:

a quantitative rating is respectively determined for several trained generators; and a generator of the trained generators having a best quantitative rating is connected upstream of the further trained generator so that overall, an overall generator is formed that generates an image from an input vector and a list of classes.

11. The method according to claim 10, wherein:

a plurality of input vectors and lists of classes is provided;

training input images are generated from the input vectors and lists of classes using the overall generator;

an image classifier is trained using the training input images;

the trained image classifier is supplied with input images recorded with at least one sensor carried by a vehicle;

a control signal is formed from an output of the image classifier; and the vehicle is controlled with the control signal.

12. A non-transitory machine-readable storage medium on which is stored a computer program for quantitatively rating a trained generator that generates a target segmentation map from an input vector from a predetermined input distribution, the computer program, when executed by one or more computers, causing the one or more computers to perform the following steps:

drawing at least one input vector from the predetermined input distribution;

drawing at least one list of classes from a predetermined class distribution, wherein the predetermined class distribution is determined from a probability distribution that indicates a conditional probability $P(D_c|C_c)$ with which pairs of objects of which classes $C_c$ and $D_c$ occur together in a predetermined data set D of images, wherein the predetermined class distribution is interpolated between the probability distribution $P(D_c|C_c)$ and a uniform distribution $U(D_c)$ of all object classes $D_c$ occurring in the images in the data set D;

determining, using the trained generator, a target segmentation map, which assigns classes from the list of classes to pixels of an image to be generated, from the input vector;

generating, using at least the target segmentation map, an image whose semantic content is in line with the target segmentation map;

determining a semantic segmentation map of the generated image using an image classifier;

determining, using a predetermined metric, a degree of matching between the semantic segmentation map and the target segmentation map; and determining, using the degree of matching, the quantitative rating of the trained generator.

13. One or more computers configured to quantitatively rate a trained generator that generates a target segmentation map from an input vector from a predetermined input distribution, the one or more computers configured to:

draw at least one input vector from the predetermined input distribution;

draw at least one list of classes from a predetermined class distribution, wherein the predetermined class distribution is determined from a probability distribution that indicates a conditional probability $P(D_c|C_c)$ with which pairs of objects of which classes $C_c$ and $D_c$ occur together in a predetermined data set D of images, wherein the predetermined class distribution is interpolated between the probability distribution $P(D_c|C_c)$ and a uniform distribution $U(D_c)$ of all object classes $D_c$ occurring in the images in the data set D;

determine, using the trained generator, a target segmentation map, which assigns classes from the list of classes to pixels of an image to be generated, from the input vector;

generate, using at least the target segmentation map, an image whose semantic content is in line with the target segmentation map;

determine a semantic segmentation map of the generated image using an image classifier;

determine, using a predetermined metric, a degree of matching between the semantic segmentation map and the target segmentation map; and determine, using the degree of matching, the quantitative rating of the trained generator.

\* \* \* \* \*